United States Patent
Jeong et al.

(10) Patent No.: US 12,314,592 B2
(45) Date of Patent: May 27, 2025

(54) STORAGE SYSTEM AND OPERATION METHOD THEREFOR

(71) Applicant: SAMSUNG ELECTRONICS CO., LTD., Suwon-si (KR)

(72) Inventors: Wonseb Jeong, Suwon-si (KR); Soo-Young Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/141,007

(22) Filed: Apr. 28, 2023

(65) Prior Publication Data

US 2023/0384960 A1   Nov. 30, 2023

(30) Foreign Application Priority Data

May 31, 2022  (KR) .......................... 10-2022-0067039
Nov. 2, 2022  (KR) .......................... 10-2022-0144217

(51) Int. Cl.
*G06F 3/06* (2006.01)

(52) U.S. Cl.
CPC .......... *G06F 3/0647* (2013.01); *G06F 3/0619* (2013.01); *G06F 3/0659* (2013.01); *G06F 3/0688* (2013.01)

(58) Field of Classification Search
CPC .... G06F 3/0647; G06F 3/0619; G06F 3/0659; G06F 3/0688; G06F 2212/602; G06F 2212/7202; G06F 12/0246; G06F 12/0862
See application file for complete search history.

(56) References Cited

U.S. PATENT DOCUMENTS

| | | | |
|---|---|---|---|
| 9,304,828 B2 | 4/2016 | Nakajima et al. | |
| 9,858,197 B2* | 1/2018 | Jung | G06F 12/0868 |
| 10,228,864 B1 | 3/2019 | Zelenov et al. | |
| 10,303,617 B2 | 5/2019 | Kim et al. | |
| 10,691,593 B1 | 6/2020 | Korzh | |
| 11,971,859 B2* | 4/2024 | Thoppil | G06F 16/182 |
| 2015/0067258 A1* | 3/2015 | Jung | G06F 12/0868 711/119 |
| 2016/0278067 A1* | 9/2016 | Badam | H04W 72/51 |
| 2018/0018245 A1* | 1/2018 | Kori | G06F 11/1441 |
| 2019/0205244 A1* | 7/2019 | Smith | G06F 3/065 |
| 2021/0081273 A1 | 3/2021 | Helmick et al. | |
| 2021/0311646 A1 | 10/2021 | Malladi et al. | |
| 2021/0374080 A1 | 12/2021 | Horwich et al. | |
| 2022/0100669 A1 | 3/2022 | Choe et al. | |

(Continued)

OTHER PUBLICATIONS

Extended European Search Report dated Nov. 3, 2023 issued by the European Patent Office in Counterpart European Application No. 23171416.3.

*Primary Examiner* — Sean D Rossiter
(74) *Attorney, Agent, or Firm* — Sughrue Mion, PLLC

(57) ABSTRACT

Disclosed are a storage system and an operation method therefor. The storage system includes: a host system; and a plurality of storage sets configured to interface with the host system. At least one of the plurality of storage sets includes: a first memory region; a second memory region; and a third memory region, and the at least one of the plurality of storage sets is configured to move data stored in the third memory region to a selected memory region among the first memory region and the second memory region based on a data access feature.

20 Claims, 12 Drawing Sheets

(56) References Cited

U.S. PATENT DOCUMENTS

2022/0164286 A1    5/2022  Jeong et al.
2022/0188178 A1*   6/2022  Bert .................... G06F 11/0772
2022/0358042 A1*  11/2022  Malladi ............... G06F 12/0828
2022/0391235 A1*  12/2022  Ghetie ................ G06F 9/45504

* cited by examiner

STORAGE SYSTEM AND OPERATION METHOD THEREFOR

CROSS-REFERENCE TO RELATED APPLICATIONS

This application claims priority to Korean Patent Application No. 10-2022-0067039, filed on May 31, 2022, and Korean Patent Application No. 10-2022-0144217, filed on Nov. 2, 2022, in the Korean Intellectual Property Office, the disclosures of which are incorporated by reference herein in their entireties.

BACKGROUND

The present disclosure relates to a storage system and an operation method therefor.

A storage device is a device, which stores data. For example, the storage device may operate under a control of a host device such as a computer, a smart phone, or a smart pad, and may include, for example, a device, which stores data in a semiconductor memory, in particular, a nonvolatile memory, such as a solid state drive (SSD), a memory card, etc. In addition, the storage device may perform calculation functions depending on implementation thereof, and may include an additional volatile memory and a core for executing the calculation functions, to perform the calculation functions. A long latency of a nonvolatile memory such as a NAND flash memory included in the storage device is a major factor in degrading performance, and thus, techniques capable of improving the performance of a storage device are desired.

SUMMARY

Embodiments of the present disclosure provide a storage system capable of improving performance by performing caching and pre-fetching using data access features.

According to an aspect of an embodiment, a storage system includes: a host system; and a plurality of storage sets configured to interface with the host system. At least one of the plurality of storage sets includes: a first memory region; a second memory region; and a third memory region. The at least one of the plurality of storage sets is configured to move data stored in the third memory region to a selected memory region among the first memory region and the second memory region based on a data access feature.

According to an aspect of an embodiment, a storage set includes: a first memory region including a first volatile memory; a second memory region including a second volatile memory; a third memory region including a nonvolatile memory; a controller configured to control the first memory region, the second memory region and the third memory region; and a bridge configured to provide an interface between the storage set and a host system. The controller is further configured to move data stored in the third memory region to a selected memory region, among the first memory region and the second memory region, based on a data access feature.

According to an aspect of an embodiment, a method of operating a storage set is provided. The storage set includes a plurality of memory regions and is communicably coupled with a host system. The plurality of memory regions includes a first memory region with a nonvolatile memory and a second memory region with a volatile memory. The method includes: identifying a memory region from among the plurality of memory regions corresponding to data stored in the first memory region, based on a data access feature associated with the data; checking whether the data is stored in the identified memory region; and moving the data from the first memory region to the second memory region, based on the identified memory region being the second memory region.

BRIEF DESCRIPTION OF DRAWINGS

The above and other aspects and features of the present disclosure will be more clearly understood from the following description of example embodiments, taken in conjunction with the accompanying drawings, in which.

DETAILED DESCRIPTION

Hereinafter, embodiments will described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
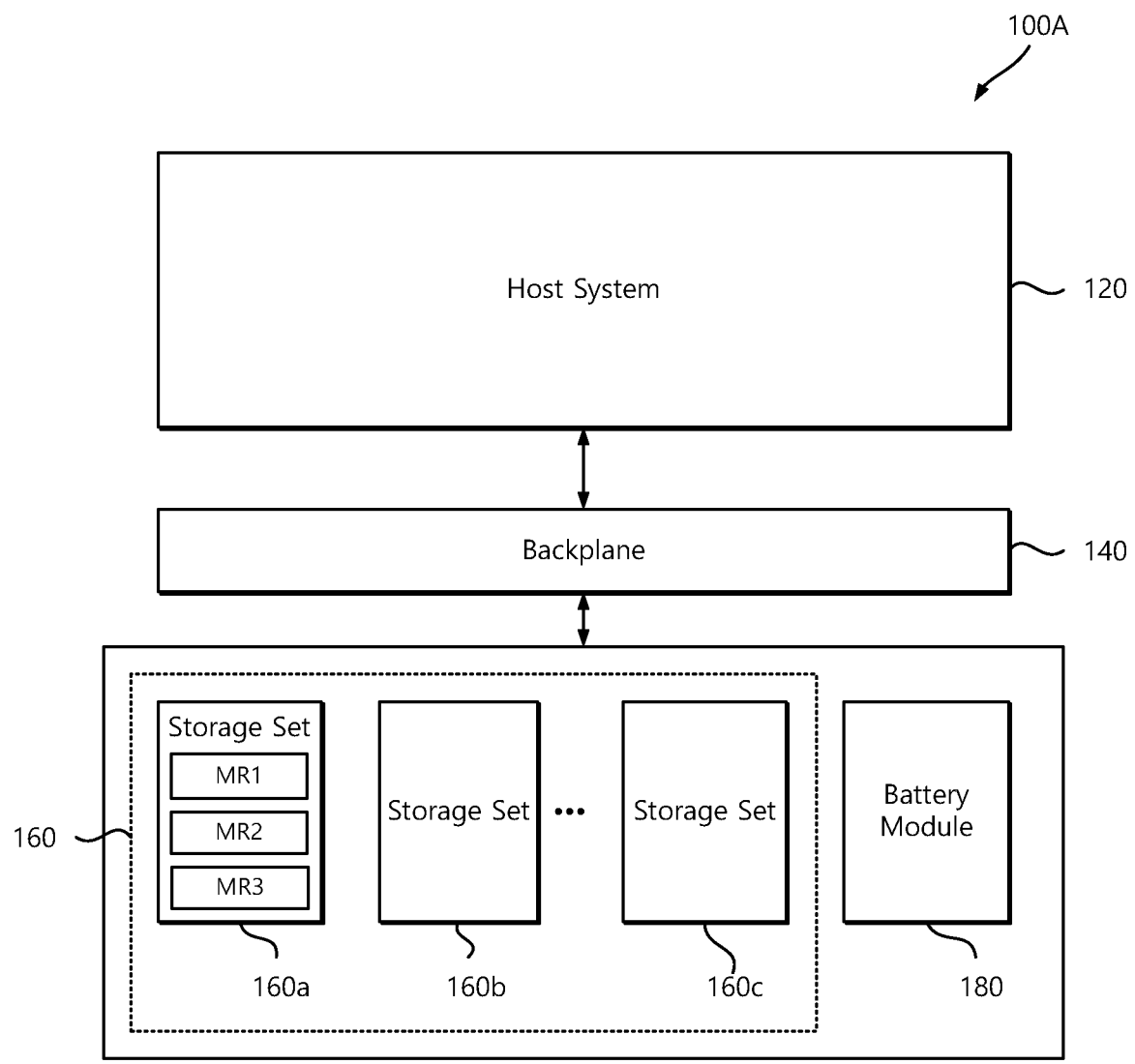
FIG. 1 illustrates a storage system 100A, according to an embodiment.

FIG. 1 illustrates a storage system 100A, according to an embodiment.

Referring to FIG. 1, the storage system 100A according to an embodiment includes a host system 120, a backplane 140, a storage set 160, and a battery module 180.

The storage system 100A may be implemented as, for example, a server, a data center, a personal computer (PC), a network-attached storage, an Internet of Things (IoT) device, or a portable electronic device. Portable electronic devices may include laptop computers, mobile phones, smart phones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, etc.

The host system 120 may communicate with the storage set 160 through various interfaces. For example, the host system 120 may be implemented with an Application Processor (AP) or a System-On-a-Chip (SoC). Also, for example, the host system 120 may be implemented with an integrated circuit or a main board, but embodiments are not limited thereto.

The host system 120 may transmit a write request and a read request to the storage set 160. The storage set 160 may store data received from the host system 120 in response to a write request, and may read stored data and transmit the read data to the host system 120 in response to a read request. In addition, the host system 120 may transmit a pre-fetch request to the storage set 160. In response to the pre-fetch request, the storage set 160 may perform caching or pre-fetching of data stored in a memory region with relatively long latency to a memory region with relatively short latency.

The backplane 140 is provided between the host system 120 and the storage set 160, is connected to the host system 120 and the storage set 160, and may be configured to allow the host system 120 and the storage set 160 to exchange data through various communication protocols.

The storage set 160 and the battery module 180 may be accommodated in a form factor. The form factor may include a variety of form factors conforming to standard specifications, and may be, for example, an Enterprise and Data Center Standard Form Factor (EDSFF) including E3.S, E3.S 2T, E3.L, and E3.L 2T, but embodiments are not limited thereto.

A plurality of storage sets 160a to 160c may be provided in the storage set 160 and may be connected to the host system 120 and the battery module 180 through the backplane 140. The storage set 160 is a device having an calculation function and a data storage function, and may be referred to as a smart storage device. The storage set 160 may receive power from the host system 120 and the battery module 180 through the backplane 140.

The battery module 180 is connected to the host system 120 and the plurality of storage sets 160 through the backplane 140. The battery module 180 may be implemented with, for example, a lithium-ion battery, a rechargeable battery, a capacitor, a super-capacitor, etc. However, this is only illustrative, and embodiments are not limited thereto. The battery module 180 may provide power to the host system 120 and the plurality of storage sets 160. In addition, when main power provided by the host system 120 decreases below a reference power level, the battery module 180 may be used as a reserve power source. In this case, the battery module 180 may be used to replace or supplement power supplied from an external power source.

In an embodiment, at least one of the plurality of storage sets 160 may include a plurality of memory regions. For convenience of description, it will be assumed that the storage set 160 includes three memory regions MR1, MR2, and MR3. However, this is only illustrative, and embodiments are not limited thereto. For example, the storage set 160 may include two memory regions or more than three memory regions.

The plurality of memory regions MR1, MR2, and MR3 form a memory hierarchy, and may be provided to store data of different characteristics, respectively.

For example, the first memory region MR1 may be provided to store immediately used data. In this case, the immediately used data may refer to data that should be immediately transferred in response to a request received from the host system 120. The first memory region MR1 may be implemented with a memory having relatively low latency. The first memory region MR1 may be implemented with, for example, a volatile memory such as a DRAM. In addition, the first memory region MR1 may be implemented with an SRAM or an eSRAM.

For example, the second memory region MR2 may be provided to store frequently used data. In this case, the frequently used data may be data that is accessed by the host system 120 with high frequency, and may refer to data that is likely to be accessed by the host system 120 at a near point in time. The second memory region MR2 may be implemented with a memory having relatively low latency. The second memory region MR2 may be implemented with, for example, a volatile memory such as a DRAM.

For example, the third memory region MR3 may be provided to store important data. In this case, the important data may refer to data that should not be lost even in situations such as sudden power off (SPO). The third memory region MR3 may be implemented with a memory having relatively long latency. The third memory region MR3 may be implemented with a nonvolatile memory such as, for example, a NAND flash memory.

The storage system 100 according to an embodiment may store data in any one of the first to third memory regions MR1 to MR3 based on a data access feature. Alternatively, the storage system 100 may move data stored in the third memory region MR3 having a long latency to the first memory region MR1 or the second memory region MR3 having a relatively short latency. For example, the data access feature may indicate whether the data is data that should be immediately transferred in response to a request received from the host system 120, data that is accessed by the host system 120 with high frequency, data that should not be lost even in situations such as SPO, or data that should be transferred securely against attack. In this way, by changing the memory region in which data is stored depending on the data access feature, the storage system 100 according to an embodiment may efficiently manage data, and thus overall performance may be improved.

Hereinafter, components included in the storage system 100 will be described.

Figure 2:
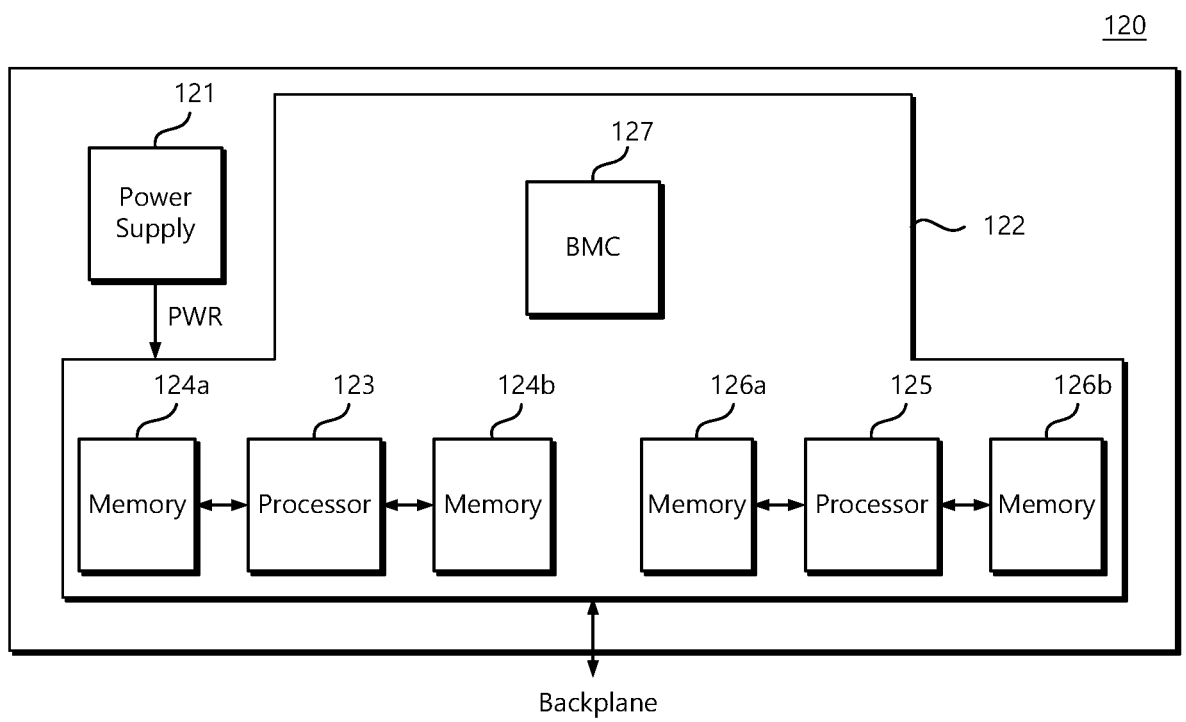
FIG. 2 illustrates a host system 120, according to an embodiment.

FIG. 2 illustrates a host system 120, according to an embodiment.

Referring to FIG. 2, the host system 120 according to an embodiment includes a power supply 121 and a main board 122. The power supply 121 generates power PWR from a power source and supplies the generated power PWR to the main board 122. Alternatively, the power supply 121 may directly supply power to the backplane 140.

The main board 122 may be referred to as a mother board or a base board, and includes a first processor 123, a plurality of first memories 124a and 124b connected to the first processor 123, a second processor 125, a plurality of second memories 126a and 126b connected to the second processor 125, and a Baseboard Management Controller (BMC) 127.

The first processor 123 may use the plurality of first memories 124a and 124b as operation memories, and the second processor 125 may use the plurality of second memories 126a and 126b as operation memories. The first processor 123 and the second processor 125 may be configured to run an operating system and various applications.

For example, the first processor 123 and the second processor 125 may transmit information associated with the data access feature to the plurality of storage sets 160 through the backplane 140. In this case, at least one storage set among the plurality of storage sets 160 may move data stored in the third memory region MR3 (refer to FIG. 1) to the first memory region MR1 or the second memory region MR2, based on the data access feature. In addition, the first processor 123 and the second processor 125 may access the backplane 140 to control power management with respect to the plurality of storage sets 160.

The first processor 123 and the second processor 125 may be central processing units (CPUs), and the plurality of first memories 124a and 124b and the plurality of second memories 126a and 126b may be a volatile memory such as a DRAM or an SRAM.

The BMC 127 may be a separate system from the first processor 123 and the second processor 125, and may monitor physical states of components of the storage system 100, including, for example, temperature, humidity, a voltage of the power supply 121, a fan speed, communication parameters, or operating system functions. Alternatively, for example, the BMC 127 may offload power management operations to the battery module 180.

Figure 3:
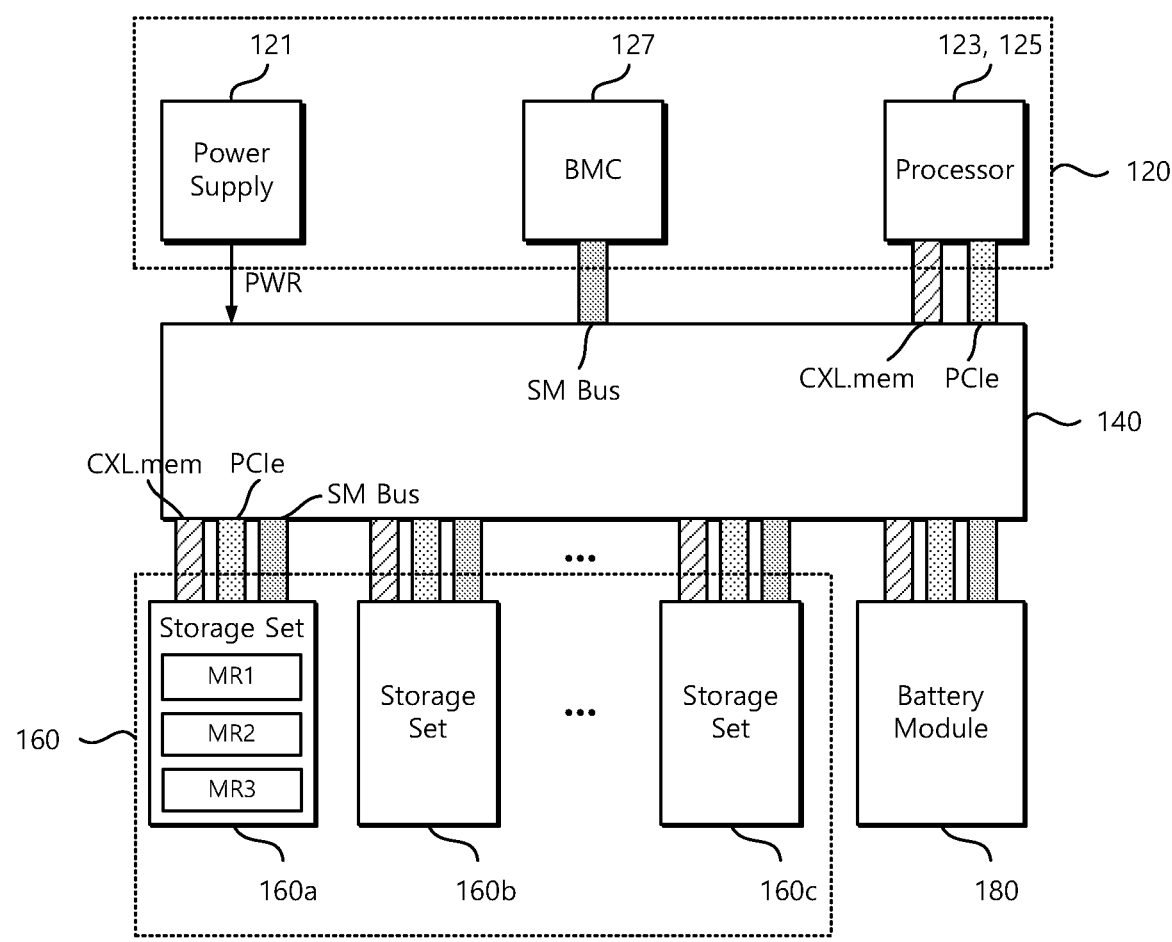
FIG. 3 is a diagram illustrating an interface method between a host system 120 and a plurality of storage sets 160, according to an embodiment.

FIG. 3 is a diagram illustrating an interface method between a host system 120 and a plurality of storage sets 160, according to an embodiment.

Referring to FIG. 3, the backplane 140 is connected to the host system 120 and each storage set 160 through a connection interface. The connection interfaces include, for example, any one of interfaces, or a combination thereof, such as a Peripheral Component Interconnect Express (PCIe), an Advanced Technology Attachment (ATA), a Serial ATA (SATA), a Parallel ATA (PATA), a Small Computer Systems Interface (SCSI), a serial attached SCSI (SAS), a Nonvolatile Memory Express (NVMe), a NVMe-over-fabric (NVMeoF), an Advanced eXtensible Interface (AXI), an Ultra Path Interconnect (UPI), an Ethernet, a Transmission Control Protocol/Internet Protocol (TCP/IP), a remote direct memory access (RDMA), RDMA over Converged Ethernet (ROCE), a FibreChannel, an InfiniBand, an iWARP, a Memory Semantic Interface, a Memory Coherent Interface, a Compute Express Link (CXL), a CXL.mem, a CXL.io, a CXL.cache, a Gen-Z, a Coherent Accelerator Processor Interface (CAPI), a Cache Coherent Interconnect for Accelerators (CCIX), a System Management (SM) Bus, a Universal Serial Bus (USB), an Multi-Media Card (MMC), an Enhanced Small Disk Interface (ESDI), or an Integrated Drive Electronics (IDE).

In an embodiment, the host system 120 and the plurality of storage sets 160 may be connected through two different interfaces. For example, at least one of the processors 123 and 125 of the host system 120 may be connected to the plurality of storage sets 160 through first and second interfaces, and the BMC 127 of the host system 120 may be connected to the plurality of storage sets 160 through a third interface. Hereinafter, for convenience of description, it is assumed that the CXL.mem interface is used as the first interface, the PCIe interface is used as the second interface, and the SM Bus is used as the third interface. However, this is an example, and the interfaces may be variously combined. For example, the CXL.io interface may be used instead of the PCIe interface, and the CXL.cache interface may be used instead of the CXL.mem interface. Alternatively, the CXL.mem interface and the CXL.cache interface may be used simultaneously.

As described above, the host system 120 and the plurality of storage sets 160 according to an embodiment may be connected to each other through a plurality of different interfaces. In this case, data transferred through the plurality of different interfaces may be stored in any one of the first to third memory regions MR1 to MR3 depending on the data access feature. For example, data transferred to the storage set 160a through the CXL.mem interface may be stored in any one of the first to third memory regions MR1 to MR3 depending on the data access feature, and data transferred to the storage set 160a through the PCIe interface may also be stored in any one of the first to third memory regions MR1 to MR3 depending on the data access feature. The operation of receiving data through the CXL.mem interface and the operation of receiving data through the PCIe interface may be performed at different times or simultaneously. In this way, by differentiating the memory region in which data is stored according to the data access feature, efficient data management is possible, and thus overall performance may be improved.

Figure 4:
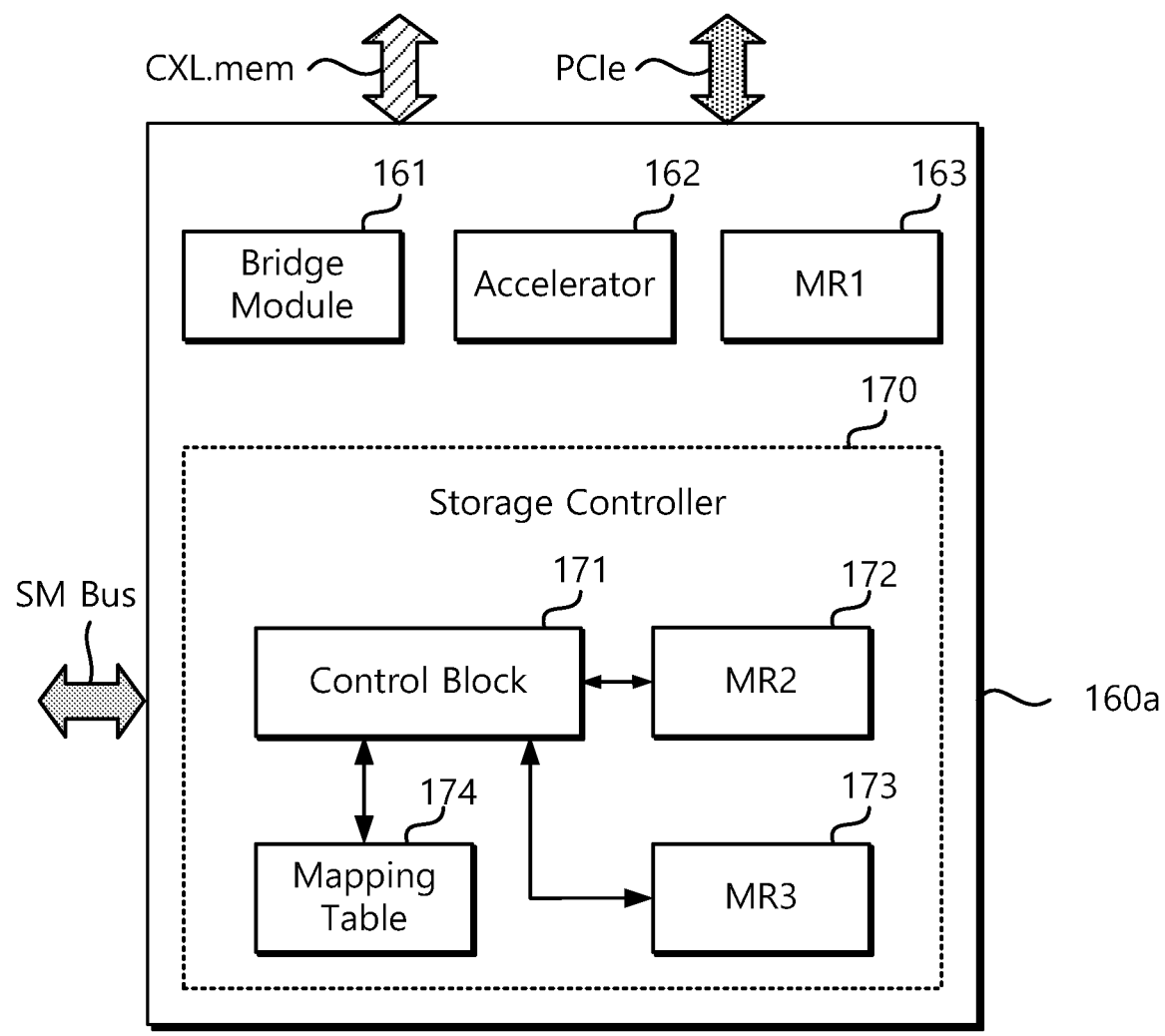
FIG. 4 illustrates a storage set, according to an embodiment.

FIG. 4 illustrates a storage set, according to an embodiment. Hereinafter, for convenience of description, it is assumed that the CXL.mem, the PCIe, and the SM Bus are used as the first to third interfaces, respectively.

Referring to FIG. 4, the storage set 160a may be connected to the host system 120 (refer to FIG. 1) through a plurality of different connection interfaces (the CXL.mem, the PCIe, and the SM Bus). The storage set 160a includes a bridge module 161, an accelerator 162, a first memory region 163, and a storage controller 170, and the storage controller 170 includes a control block (e.g., controller) 171, a second memory region 172, a third memory region 173, and a mapping table 174.

The bridge module 161 may perform an interface operation between the host system 120 and the storage controller 170. When information associated with the data access feature of data is received from the host system 120, the bridge module 161 may transmit the information to the storage controller 170. Alternatively, when information associated with the data access feature of data is received, the bridge module 161 may check whether the corresponding data is stored in the first memory region 163.

The accelerator 162 may perform an acceleration function of assisting a calculation of the host system 120 by performing some of calculations performed by the host system 120. For example, the accelerator 162 is connected to the storage controller 170, may receive input data from the storage controller 170, may perform calculation on the input data to generate calculation data, and may store the generated calculation data into the first memory region MR1 or may transmit the generated calculation data to the storage controller 170. The accelerator 162 may perform the above-described calculation operations in response to a command of the host.

The first memory region 163 may be referred to as a first buffer memory and may store immediately used data. For example, the first memory region 163 may store calculation data according to the calculation from the accelerator 162. Alternatively, the first memory region 163 may store data to be returned relatively quickly among read-requested data from the host system 120. Alternatively, the first memory region 163 may store data having a relatively high priority among pre-fetching-requested data from the host system 120.

The first memory region 163 may be, for example, a volatile memory such as a DRAM or an SRAM.

The storage controller 170 may include an internal memory embedded in an electronic device. For example, the storage controller 170 may include a Solid State Drive (SSD), an embedded Universal Flash Storage (UFS) memory device, or an embedded Multi-Media Card (eMMC). In some embodiments, the storage controller 170 may be or may include an external memory removable from the electronic device. For example, the storage controller 170 may be or may include a UFS memory card, a Compact Flash (CF), a Secure Digital (SD), a MicroSecure Digital (Micro-SD), a Mini Secure Digital (Mini-SD), an extreme Digital (xD), or a memory stick.

The storage controller 170 may communicate with the host system 120 through a plurality of different interfaces (the CXL.mem, the PCIe, the SM Bus) described above. The storage controller 170 may receive a command (host command) from the host system 120 and may analyze the command to generate a command to control the accelerator 161.

The storage controller 170 includes the control block 171, the second memory region 172, the third memory region 173, and the mapping table 174.

The control block 171 may generate input data required to perform an operation requested by the host system 120 based on a command. Alternatively, the control block 171 may read data from the second memory region 172 or the third memory region 173 in response to a request from the host system 120. Also, the control block 171 may receive information associated with the data access feature of data from the bridge module 161. The control block 171 may check whether corresponding data is stored in the second memory region 172 or the third memory region 173.

The second memory region 172 may be referred to as a second buffer memory and may store frequently used data. Alternatively, the second memory region 172 may store data to be returned relatively slowly among read-requested data from the host system 120. Alternatively, the second memory region 172 may store data having a relatively low priority among pre-fetching-requested data from the host system 120. For example, the second memory region 172 may be a volatile memory such as a DRAM or an SRAM.

The third memory region 173 is a nonvolatile memory and may store important data. For example, the third memory region 173 may be a nonvolatile memory such as a NAND flash memory.

The mapping table 174 may manage an address ADDR with regard to data stored in the third memory region 173 that is a nonvolatile memory. For example, the mapping table 174 may manage an address such as a logical address (LA) or a physical address (PA) of data stored in the third memory region 173. In this case, the control block 171 may check whether data requested by the host system 120 is stored in the third memory region MR3 through the mapping table 174. However, this is illustrative, and the mapping table 174 may also manage addresses for data stored in the first memory region 163 and/or the second memory region 172, which are volatile memories.

According to an embodiment, the storage controller 170 may store data in any one of the first to third memory regions MR1 to MR3, based on the data access feature. Alternatively, the storage controller 170 may move data stored in any one of the first to third memory regions MR1 to MR3 to another memory region based on the data access feature. For example, the storage controller 170 may move data stored in the first memory region MR1 to the second memory region MR2 or the third memory region MR3 based on the data access feature. For example, the storage controller 170 may move data stored in the second memory region MR2 to the first memory region MR1 or the third memory region MR3 based on the data access feature. For example, the storage controller 170 may move data stored in the third memory region MR3 to the first memory region MR1 or the second memory region MR2 based on the data access feature. In this way, by changing the memory region in which data is stored depending on the data access feature, overall system performance may be improved.

Figure 5:
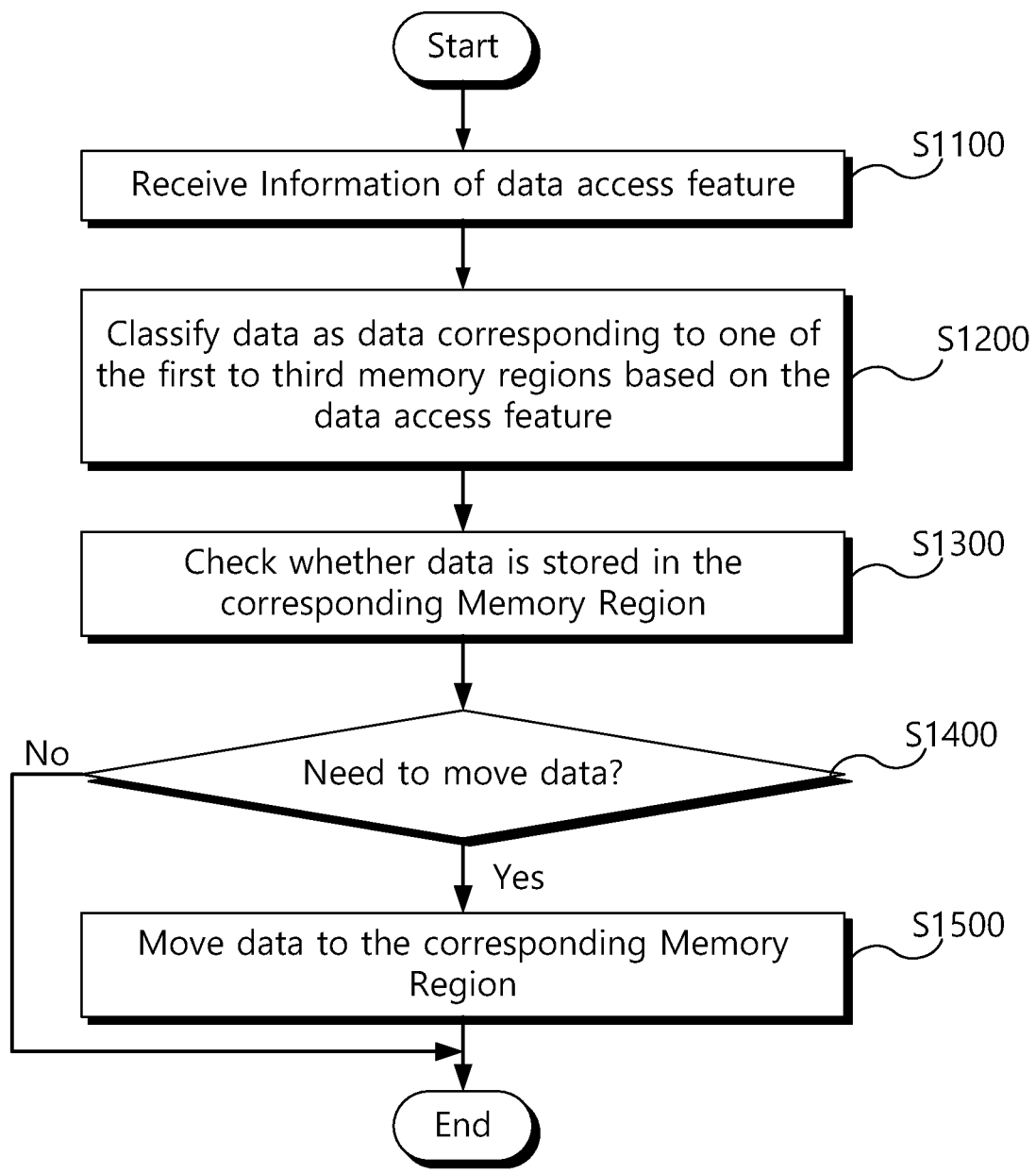
FIG. 5 is a flowchart illustrating an example of an operation of the storage system 100A, according to an embodiment.

FIG. 5 is a flowchart illustrating an example of an operation of the storage system 100A, according to an embodiment.

In operation S1100, the storage set 160a may receive information associated with the data access feature from the host system 120. For example, the storage set 160a may receive information associated with the data access feature through at least one of the first to third interfaces.

In operation S1200, the storage set 160a may classify data as data corresponding to one of the first to third memory regions MR1 to MR3 based on the data access feature. For example, the storage set 160a may classify data to be immediately returned to the host system 120 as those corresponding to the first memory region MR1, may classify frequently used data as those corresponding to the second memory region MR2, and may classify important data as those corresponding to the third memory region MR3.

In operation S1300, the storage set 160a may check whether the classified data is stored in the corresponding memory region. For example, the storage set 160a may check whether data classified as corresponding to the first memory region MR1 is actually stored in the first memory region MR1.

In operation S1400, the storage set 160a may determine whether data movement is necessary based on whether the memory region to which the data corresponds and the memory region in which the data is actually stored match each other.

When the corresponding memory region and the stored memory region do not match, the storage set 160a may move the corresponding data to the corresponding memory region (operation S1500). For example, when immediately used data corresponding to the first memory region MR1 is stored in the third memory region MR3, the storage set 160a may cache or pre-fetch the corresponding data in the first memory region MR1.

When the corresponding memory region and the stored memory region match each other, the storage set 160a may continue to store the corresponding data in the corresponding memory region. In this regard, the operation of moving the data may be omitted when the corresponding memory region and the stored memory region match each other.

In this way, the overall performance of the storage system 100A may be improved by changing the memory region in which the data is to be stored depending on the access feature of the data.

Figure 6:
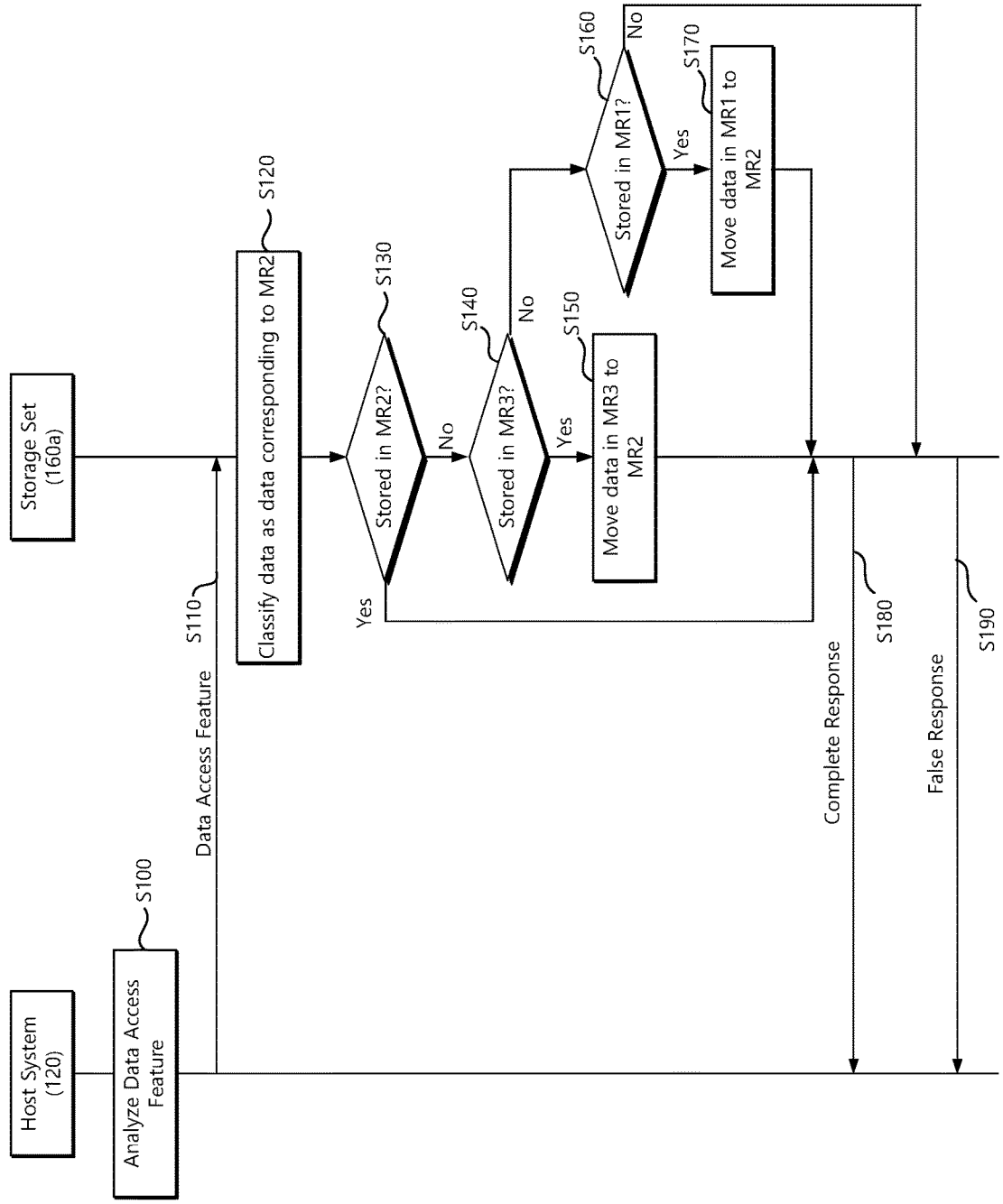
FIG. 6 is a flowchart illustrating an example of an operation of the storage system 100A, according to an embodiment.

FIG. 6 is a flowchart illustrating an example of an operation of the storage system 100A, according to an embodiment. For convenience of description, it is assumed that data access feature of data received from the host system 120 in FIG. 6 is associated with frequently used data, and the corresponding data is classified as data corresponding to the second memory region MR2.

In operation S100, the host system 120 may analyze the data access feature of data received from the host system 120.

In operation S110, the host system 120 may transmit information associated with the data access feature to the storage set 160a. For example, the host system 120 may transmit information associated with the data access feature using any one of the CXL.mem interface protocol, the PCIe interface protocol, or the SM Bus interface protocol. In an embodiment, the host system 120 may transmit information associated with the data access feature together with a command. For example, the command may be a pre-fetching command or a caching command. However, this is an example, and the command may be a lead command.

In operation S120, the storage set 160a may classify corresponding data as those corresponding to the second memory region MR2, based on information associated with the data access feature.

In operation S130, the storage set 160a may check whether corresponding data is stored in the second memory region MR2. When the corresponding data is not stored in the second memory region MR2, operation S140 may be performed. When the corresponding data is stored in the second memory region MR2, the storage set 160a may return a response indicating that the operating is complete.

In operation S140, the storage set 160a may check whether corresponding data is stored in the third memory region MR3. For example, the storage set 160a may check whether corresponding data is stored in the third memory region MR3 by referring to the mapping table 174.

When the corresponding data is stored in the third memory region MR3, operation S150 may be performed. In operation S150, the storage set 160a may move the data stored in the third memory region MR3 to the second memory region MR2. Then, in operation S180, the storage set 160a may return a response to the host system 120 indicating that the operating is complete.

When the corresponding data is not stored in the third memory region MR3, operation S160 may be performed. In operation S160, the storage set 160a may check whether corresponding data is stored in the first memory region MR1.

When the corresponding data is stored in the first memory region MR1, operation S170 may be performed. In operation S170, the storage set 160a may move the data stored in the first memory region MR1 to the second memory region MR2. Thereafter, in operation S180, the storage set 160a may transmit a response to the host system 120 indicating that the operating is complete.

When the corresponding data is not stored in the first memory region MR1, the storage set 160a may return a false response.

As described above, the storage system 100A according to an embodiment may efficiently manage data by differentiating the memory region in which data is to be stored depending on the data access feature, thereby improving overall performance of the storage system.

In FIG. 6, for convenience of description, it is assumed that the data access feature corresponds to the second memory region MR2. However, this is only illustrative, and even when the data access feature corresponds to the first memory region MR1 or the third memory region MR3, the storage system 100A may operate in the same manner or similar manner as in FIG. 6.

In FIGS. 1 to 6, it has been described that data access feature is analyzed by the host system 1200 and the host system 1200 transmits the analyzed data access feature to the storage set 160a. However, this is only illustrative, and embodiments are not limited thereto. For example, the data access feature may be identified by the storage set 160a. This will be described in more detail below.

Figure 7:
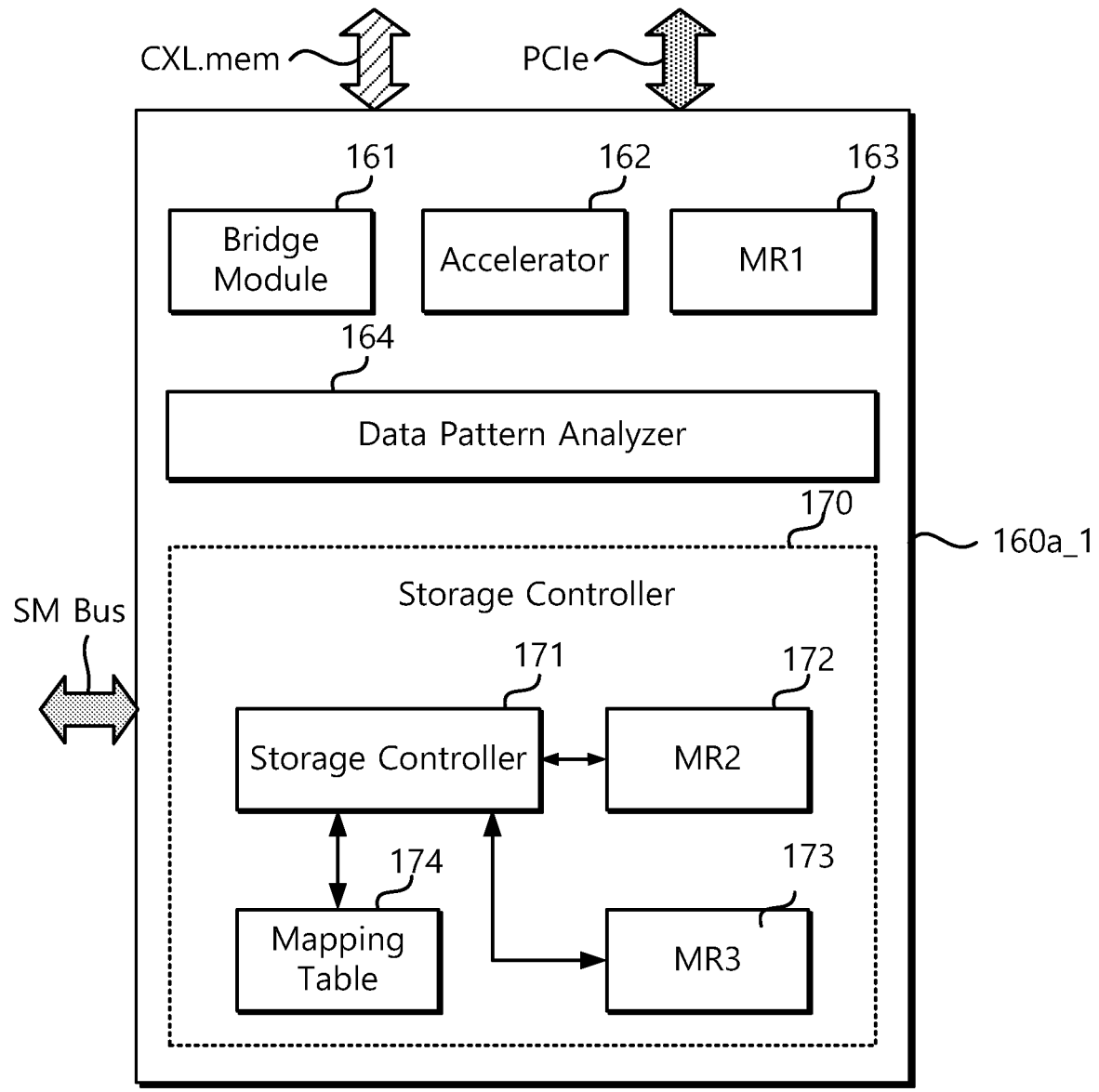
FIG. 7 illustrates a storage set 160*a*_1, according to an embodiment.

FIG. 7 illustrates a storage set 160a_1, according to an embodiment. The storage set 160a_1 of FIG. 7 is similar to the storage set 160a of FIG. 4 Therefore, the same or similar components are denoted using the same or similar reference numerals, and additional descriptions will be omitted to avoid redundancy.

Referring to FIG. 7, the storage set 160a_1 according to an embodiment further includes a data pattern analyzer 164 compared to the storage set 160a of FIG. 4.

The data pattern analyzer 164 may analyze an access pattern of data received from the host system 120 (refer to FIG. 1). For example, the data pattern analyzer 164 may analyze the data access pattern based on data call frequency, importance, security level, etc., and may extract the data access feature therefrom.

The storage set 160a_1 according to an embodiment may analyze the pattern of received data and may extract the data access feature based on the pattern analysis result. The storage set 160a_1 may store data in any one of the first to third memory regions MR1 to MR3 based on the extracted data access feature, or may move previously stored data from one memory region to another memory region. Accordingly, efficient data management is possible, and overall performance may be improved.

Figure 8:
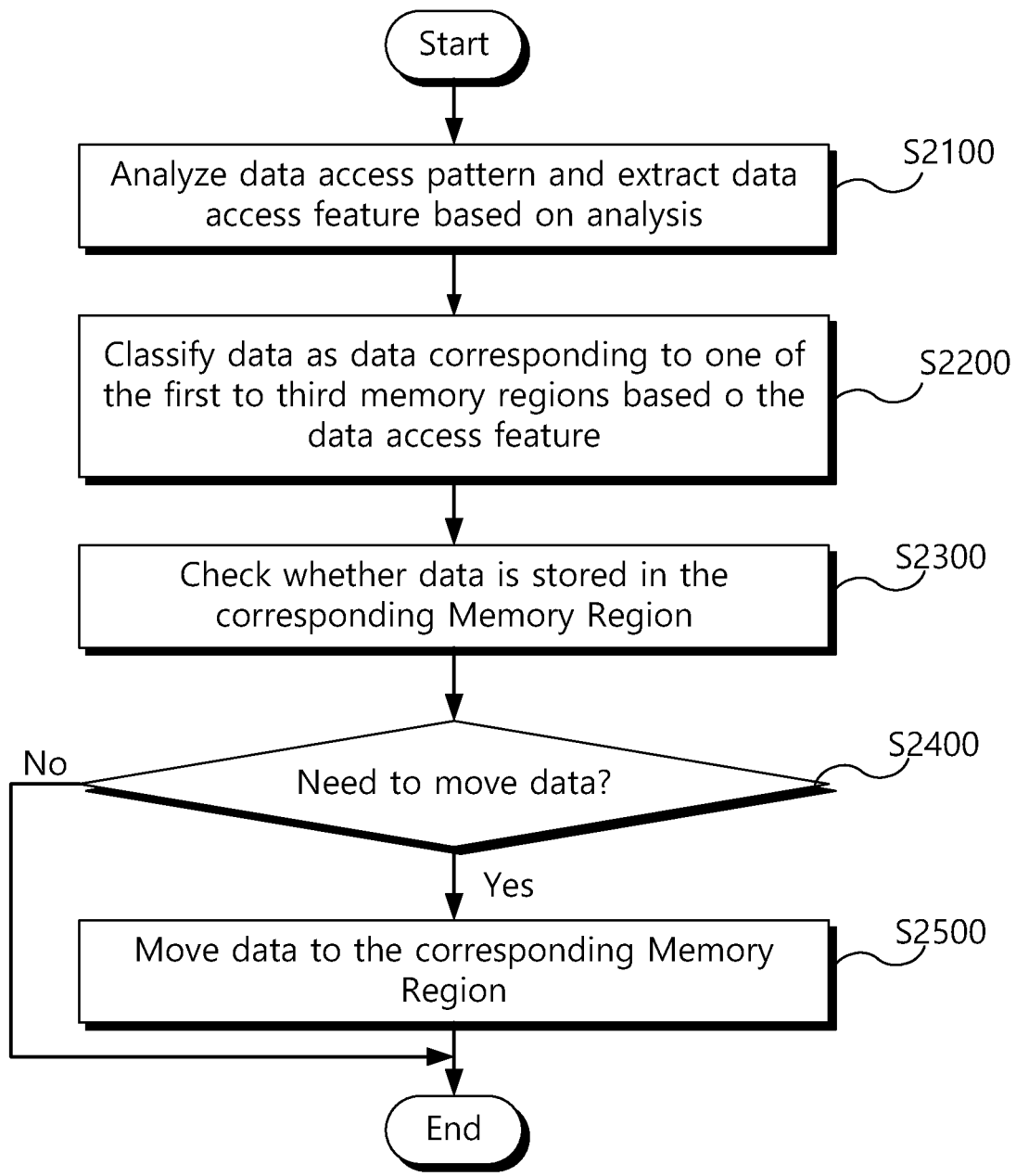
FIG. 8 is a flowchart illustrating operation of a storage set, according to an embodiment.

FIG. 8 is a flowchart illustrating an example of an operation of the storage set 160a_1 of FIG. 7.

In operation S2100, the storage set 160a_1 may analyze the access pattern associated with data. For example, the storage set 160a_1 may analyze the data access pattern based on data call frequency, importance, security level, etc., and may extract the data access feature therefrom.

In operation S2200, the storage set 160a_1 may classify data as data corresponding to one of the first to third memory regions MR1 to MR3 based on the data access feature.

In operation S2300, the storage set 160a_1 may check whether the classified data is stored in the corresponding memory region.

In operation S2400, the storage set 160a_1 may determine whether data movement is necessary based on whether the memory region to which the data corresponds and the memory region in which the data is actually stored match each other.

When the corresponding memory region and the stored memory region do not match, the storage set 160a_1 may move the corresponding data to the corresponding memory region (operation S2500). When the corresponding memory region and the stored memory region match each other, the storage set 160a_1 may continue to store the corresponding data in the corresponding memory region.

The storage set 160a_1 according to an embodiment may analyze the pattern of received data and may extract the data access feature based on the pattern analysis result. In addition, the storage set 160a_1 may change the memory region in which data is to be stored depending on the data access feature. Accordingly, overall system performance may be improved.

Figure 9:
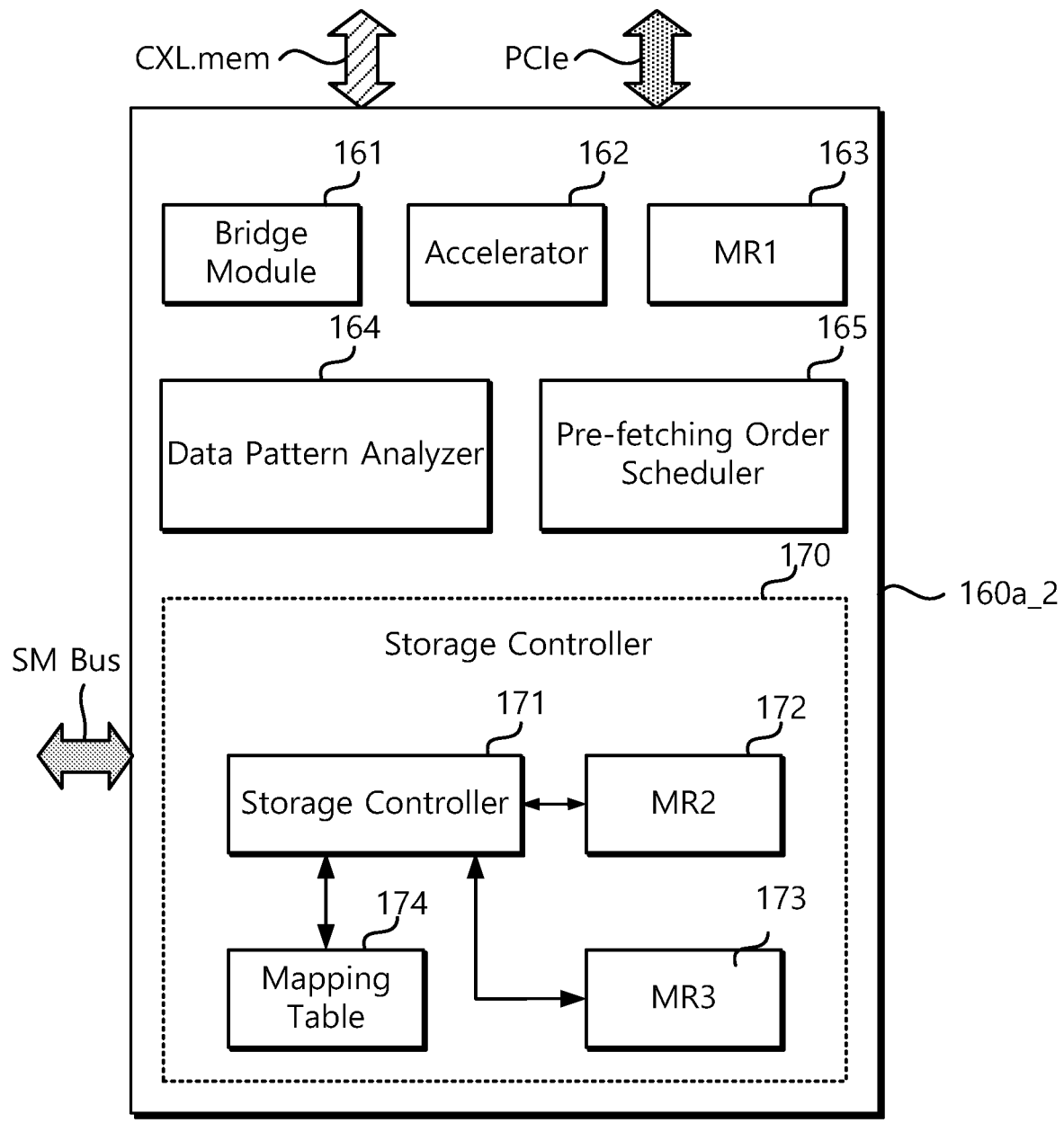
FIG. 9 illustrates a storage set 160*a*_2, according to an embodiment.

FIG. 9 illustrates a storage set 160a_2, according to an embodiment. The storage set 160a_2 of FIG. 9 is similar to the storage set 160a_1 of FIG. 7 Therefore, the same or similar components are denoted using the same or similar reference numerals, and additional descriptions will be omitted to avoid redundancy.

Referring to FIG. 9, the storage set 160a_2 according to an embodiment further includes a pre-fetching order scheduler 165 compared to the storage set 160a of FIG. 7.

The pre-fetching order scheduler 165 may monitor information associated with an operation state of the storage set 160a_2. In this case, the information associated with the operation state may include information associated with the operation state affecting the latency of the third memory region 173, which is a nonvolatile memory. For example, the information associated with the operation state may include information associated with a garbage collection, a wear leveling, a depth of an ECC protection code, etc. In addition, the information associated with the operation state may include whether the requested data is stored in a Single Level Cell (SLC) method or a Multi-Level Cell (MLC) method.

For example, when an operation with a long latency such as a garbage collection (GC) is being performed or is scheduled to be performed in a memory block corresponding to pre-fetching-requested data, the order of the corresponding pre-fetch operation may be adjusted to be performed later than other pre-fetch operation.

In this way, overall system performance may be further improved by considering not only the data access feature but also information on the operation state that affects the latency.

Figure 10:
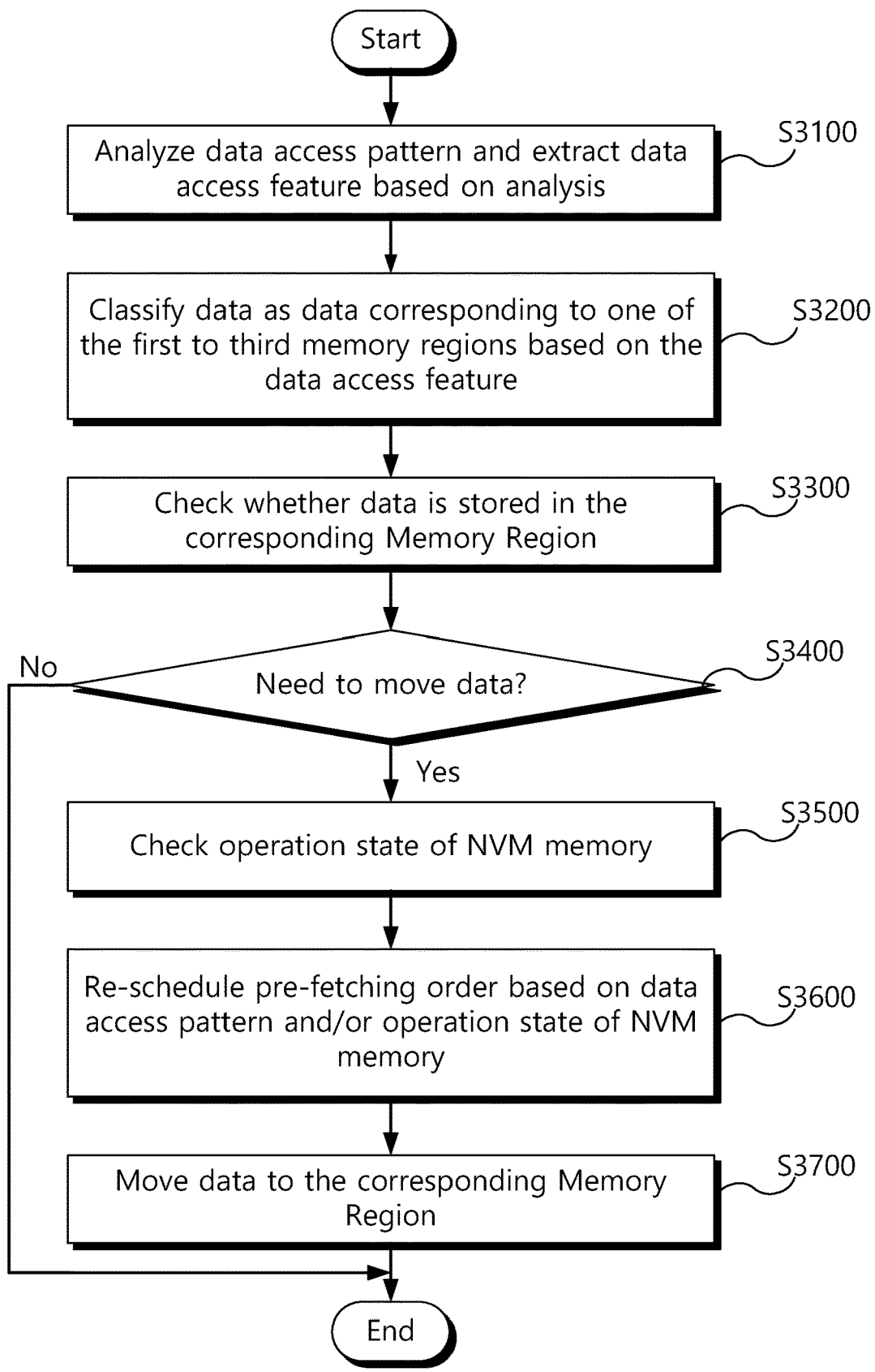
FIG. 10 is a flowchart illustrating operation of a storage according to an embodiment.

FIG. 10 is a flowchart illustrating an example of an operation of the storage set 160a_2 of FIG. 9.

In operation S3100, the storage set 160a_2 may analyze the access pattern associated with data. For example, the storage set 160a2 may analyze the data access pattern based on data call frequency, importance, security level, etc., and may extract the data access feature therefrom.

In operation S3200, the storage set 160a_2 may classify data as data corresponding to one of the first to third memory regions MR1 to MR3 based on the data access feature.

In operation S3300, the storage set 160a_2 may check whether the classified data is stored in the corresponding memory region.

In operation S3400, the storage set 160a_2 may determine whether data movement is necessary based on whether the memory region to which the data corresponds and the memory region in which the data is actually stored match each other.

When the corresponding memory region and the stored memory region match each other, the storage set 160a_2 may continue to store the corresponding data in the corresponding memory region, and operations S3500, S3600 and S3700 may be omitted. When the corresponding memory region and the stored memory region do not match, operation S3500 may be performed.

In operation S3500, the storage set 160a_2 may check the operation state of the third memory region 173, which is a nonvolatile memory. For example, the storage set 160a_2 may check whether a garbage collection, a wear leveling, ECC protection codes, etc. are being performed in the third memory region 173. Alternatively, the storage set 160a_2 may check whether the requested data is stored in an SLC or an MLC method.

In operation S3600, the storage set 160a_2 may re-schedule the pre-fetching order based on the data access pattern and/or the operation state of the nonvolatile memory.

In operation S3700, the storage set 160a2 may move data to a corresponding memory region according to the adjusted pre-fetching order.

For convenience of description, it is assumed that a first pre-fetching command ($1^{st}$ pre-fetching CMD) and a second pre-fetching command ($2^{nd}$ pre-fetching CMD) are sequentially received to the storage set 160a_2. Also, it is assumed that data corresponding to the first and second pre-fetching commands are frequently used data and corresponds to the second memory region 172 but is stored in the third memory region 173.

In an embodiment, a garbage collection operation may be being performed on a memory block corresponding to the first pre-fetching command among memory blocks of the third memory region 173. In this case, the storage set 160a_2 may adjust the pre-fetching order such that the pre-fetching operation corresponding to the second pre-fetching command is performed before the pre-fetching operation corresponding to the first pre-fetching command. In detail, the storage set 160a_2 first may pre-fetch data corresponding to the second pre-fetching command from the third memory region 173 to the second memory region 172, and may pre-fetch data corresponding to the second pre-fetching command from the third memory region 173 to the second memory region 172 after the garbage collection operation is completed.

In an embodiment, a high-level ECC protection code is applied to a memory block corresponding to the first pre-fetching command among memory blocks of the third memory region 173, and a low-level ECC protection code is applied to a memory block corresponding to the second pre-fetching command among memory blocks of the third memory region 173. In this case, the storage set 160a2 may adjust the pre-fetching order such that the pre-fetching operation corresponding to the second pre-fetching command is performed before the pre-fetching operation corresponding to the first pre-fetching command. That is, the storage set 160a2 may delay a pre-fetching operation of data corresponding to the first pre-fetching command, which requires a long latency, and may first perform a pre-fetching operation of data corresponding to the second pre-fetching command.

In this way, overall system performance may be further improved by considering not only the data access feature but also information on the operation state of the nonvolatile memory that affects the latency.

Figure 11:
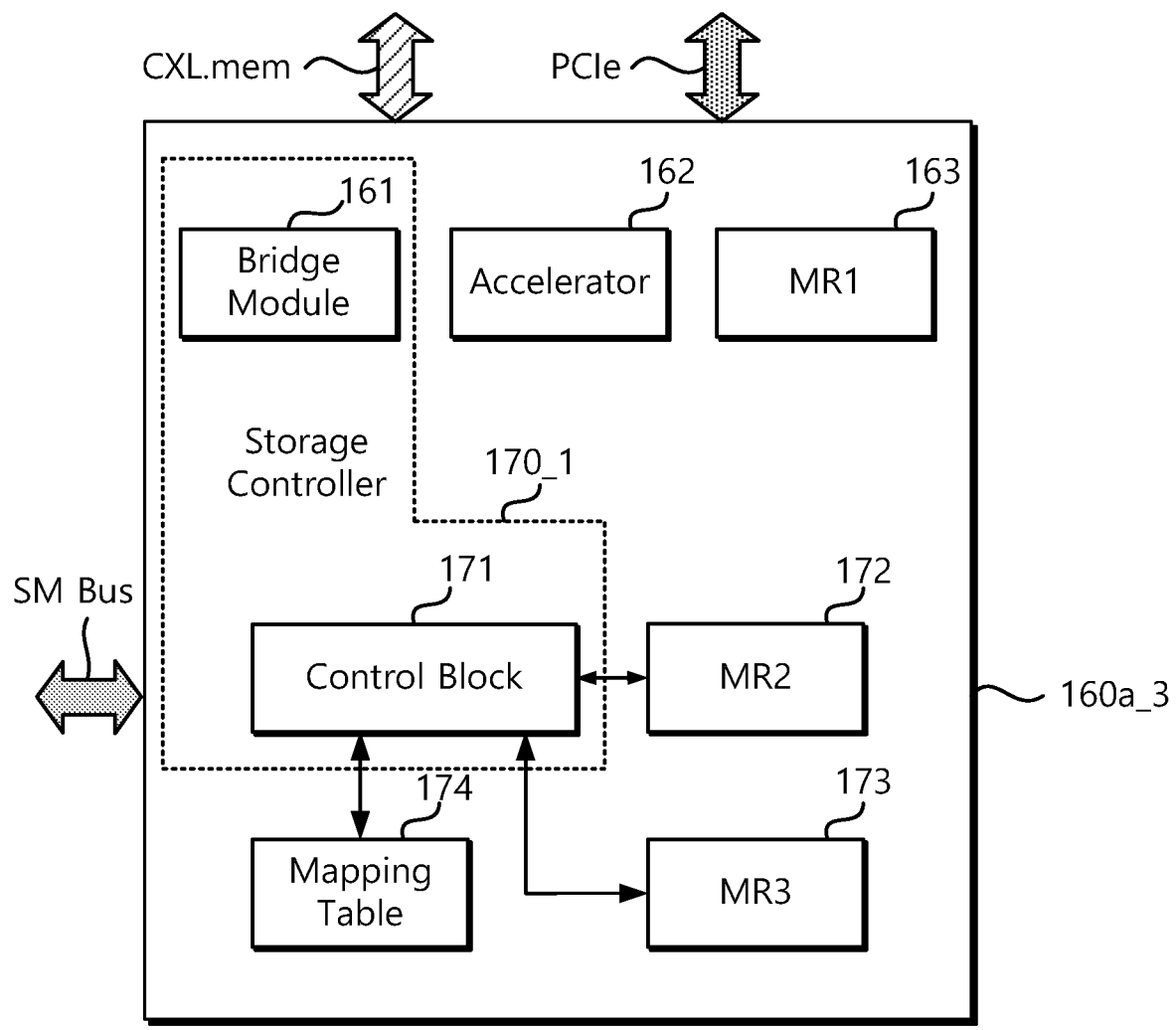
FIG. 11 is a diagram illustrating a storage set 160*a*_3, according to an embodiment.

FIG. 11 is a diagram illustrating a storage set 160a_3, according to an embodiment. The storage set 160a_3 of FIG. 11 is similar to the storage set 160a of FIG. 4 Therefore, the same or similar components are denoted using the same or similar reference numerals, and additional descriptions will be omitted to avoid redundancy.

In FIG. 4, it has been described that the control block 171, the second memory region 172, and the third memory region 173 are implemented as one storage controller 170. However, this is only illustrative, and the present disclosure is not limited thereto. For example, as illustrated in FIG. 11, the control block 171 and the bridge module 161 may be implemented as one storage controller 170_1. However, this is just an example, and the control block 171, the second memory region 172, and the third memory region 173 may be implemented as separate chips.

Figure 12:
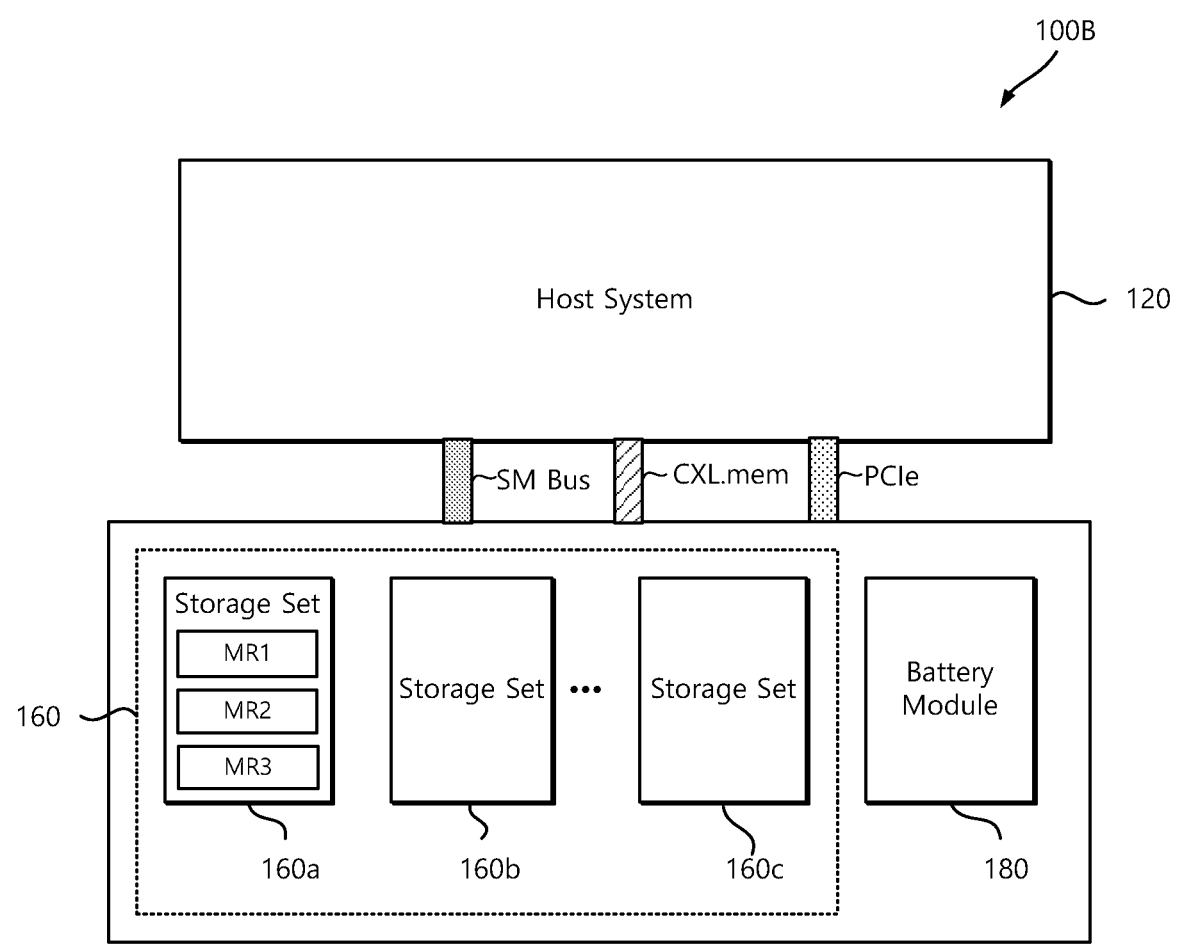
FIG. 12 illustrates a storage system 100B, according to an embodiment.

FIG. 12 illustrates a storage system 100B, according to an embodiment. The storage system 100B of FIG. 12 is similar to the storage system 100A of FIG. 1. Therefore, the same or similar components are denoted using the same or similar reference numerals, and additional descriptions will be omitted to avoid redundancy.

Unlike the storage system 100A of FIG. 1, the storage system 100B of FIG. 12 may not include a backplane. In detail, the storage system 100B of FIG. 12 includes the host system 120 and the storage set 160, and the host system 120 and the storage set 160 may be connected through first to third interfaces.

Also, in some embodiments, the storage system 100B may not include a battery module. In this case, when the main power decreases below the stored level, the storage system 100B may receive power from an external power source.

According to an embodiment, a storage system caches or pre-fetches data in different memory regions based on data access features. Accordingly, data may be efficiently managed, and performance of the storage system may be improved.

In some embodiments, each of the components represented by a block, such as those illustrated in FIGS. 1-4, 7, 9, 11 and 12, may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. A storage system comprising:
   a host system; and
   a plurality of storage sets configured to interface through two different protocols with the host system, and
   wherein at least one of the plurality of storage sets comprises:
      a first memory region;
      a second memory region; and
      a third memory region,
   wherein the at least one of the plurality of storage sets is configured to classify data stored in the third memory region as corresponding to the first memory region, the second memory region or the third memory region based on a data access feature, move the data stored in the third memory region to the first memory region based on the data being classified as corresponding to the first memory region, move the data to the second memory region based on the data being classified as corresponding to the second memory region, and maintain the data in the third memory region based on the data being classified as corresponding to the third memory region, and
   wherein the at least one of the plurality of storage sets is further configured to classify the data stored in the third memory region as corresponding to the third memory region based on the data access feature indicating the data should not be lost.

2. The storage system of claim 1, wherein the at least one of the plurality of storage sets comprises:
   an accelerator configured to support a calculation operation; and
   a storage controller comprising a plurality of nonvolatile memories,
   wherein a calculation result of the accelerator is stored in the first memory region, and
   wherein the storage controller comprises the second memory region and the third memory region.

3. The storage system of claim 2, wherein the storage controller further comprises a mapping table configured to manage addresses associated with data stored in the third memory region.

4. The storage system of claim 2, wherein the at least one of the plurality of storage sets further comprises a data pattern analyzer configured to obtain the data access feature by analyzing a pattern of data received from the host system.

5. The storage system of claim 2, wherein the at least one of the plurality of storage sets further comprises a pre-fetching order scheduler configured to adjust an execution order of pre-fetching commands received from the host system based on an operation state of the third memory region.

6. The storage system of claim 5, wherein the pre-fetching order scheduler is further configured to adjust the execution order based on at least one of a data storage method, a garbage collection, a wear leveling, and an ECC protection code with respect to a memory block in which a pre-fetching operation is to be performed in the third memory region.

7. The storage system of claim 1, wherein the host system is configured to generate the data access feature and transmit the data access feature to the at least one of the plurality of storage sets.

8. The storage system of claim 1, wherein the host system and the plurality of storage sets are configured to communicate with each other through a CXL interface and a PCIe interface.

9. The storage system of claim 1, wherein the first memory region and the second memory region each comprise a volatile memory, and the third memory region comprises a nonvolatile memory.

10. The storage system of claim 1, wherein the first memory region, the second memory region, and the third memory region form a memory hierarchical structure.

11. The storage system of claim 1, further comprising a battery circuit configured to provide power to the plurality of storage sets based on a level of a main power provided from the host system being less than or equal to that of a reference power.

12. A storage set comprising:
   a first memory region comprising a first volatile memory;
   a second memory region comprising a second volatile memory;
   a third memory region comprising a nonvolatile memory;
   a controller configured to control the first memory region, the second memory region and the third memory region; and
   a bridge configured to provide an interface between the storage set and a host system,
   wherein the controller is further configured to classify data stored in the third memory region as corresponding to the first memory region, the second memory region or the third memory region based on a data access feature, move the data stored in the third memory region to the first memory region based on the data being classified as corresponding to the first memory region, move the data to the second memory region based on the data being classified as corresponding to the second memory region, and maintain the data in the third memory region based on the data being classified as corresponding to the third memory region,
wherein the bridge is further configured to communicate with the host system using two different interface protocols, and
wherein the controller is further configured to classify the data stored in the third memory region as corresponding to the third memory region based on the data access feature indicating the data should not be lost.

13. The storage set of claim 12, further comprising an accelerator configured to support a calculation operation, and store a calculation result in the first memory region.

14. The storage set of claim 12, further comprising a data pattern analysis circuit configured to obtain the data access feature by analyzing a pattern of data received from the host system.

15. The storage set of claim 12, further comprising a pre-fetching order scheduler configured to adjust an order of pre-fetching operations, based on an operation state of the third memory region.

16. The storage set of claim 12, wherein the first memory region, the second memory region, and the third memory region form a memory hierarchical structure.

17. A method of operating a storage set that includes a plurality of memory regions and is communicably coupled with a host system through at least two different protocols, the plurality of memory regions including a first memory region with a nonvolatile memory, a second memory region with a volatile memory and a third memory region with a volatile memory, the method comprising:
   identifying a memory region from among the plurality of memory regions corresponding to data stored in the first memory region, based on a data access feature associated with the data;
   checking whether the data is stored in the identified memory region;
   maintaining the data in the first memory region, based on the identified memory region being the first memory region;
   moving the data from the first memory region to the second memory region, based on the identified memory region being the second memory region; and
   moving the data from the first memory region to the third memory region, based on the identified memory region being the third memory region,
   wherein the memory region is identified as the first memory region based on the data access feature indicating the data should not be lost.

18. The method of claim 17, further comprising receiving information indicating the data access feature from the host system.

19. The method of claim 17, further comprising identifying the data access feature by analyzing a pattern of data received from the host system.

20. The method of claim 17, further comprising:
   checking an operation state of the first memory region; and
   adjusting an execution order of pre-fetched commands received from the host system, based on the operation state of the first memory region.

* * * * *